(12) United States Patent
Yeh

(10) Patent No.: US 10,281,996 B2
(45) Date of Patent: May 7, 2019

(54) TOUCH SENSITIVE SYSTEM AND STYLUS FOR COMMANDING BY MANEUVERING AND METHOD THEREOF

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 120 days.

(21) Appl. No.: 15/343,364

(22) Filed: Nov. 4, 2016

(65) Prior Publication Data

US 2017/0131802 A1   May 11, 2017

Related U.S. Application Data

(60) Provisional application No. 62/251,205, filed on Nov. 5, 2015.

(51) Int. Cl.
  *G06F 3/046* (2006.01)
  *G06F 3/0354* (2013.01)
  *G06F 3/0488* (2013.01)

(52) U.S. Cl.
  CPC .......... *G06F 3/03545* (2013.01); *G06F 3/046* (2013.01); *G06F 3/04883* (2013.01); *G06F 2203/04105* (2013.01)

(58) Field of Classification Search
  CPC .... G06F 3/03545; G06F 3/0321; G06F 3/033; G06F 3/03546; G06F 3/0346
  See application file for complete search history.

(56) References Cited

U.S. PATENT DOCUMENTS

2010/0013860 A1* 1/2010 Mandella ............... G01B 21/04
                                                                      345/650
2013/0257777 A1* 10/2013 Benko .................. G06F 3/03545
                                                                      345/173

* cited by examiner

*Primary Examiner* — Kevin M Nguyen
(74) *Attorney, Agent, or Firm* — WPAT, PC

(57) ABSTRACT

A stylus for commanding by maneuvering is provided. The stylus includes a communication module for connecting with a computing device. The computing device is equipped with a touch sensitive panel for detecting the location of the stylus on or near the touch sensitive panel. The stylus includes at least one posture sensor; a memory for storing a maneuver database; and a stylus processor. The maneuver database store a plurality of maneuvers, each with associated one or more sets of moving vectors and an associated command. The stylus processor is configured to receive a moving trajectory from the posture sensor and to calculate one or more sets of moving vectors; based on the calculated one or more sets of moving vectors, finding the associated maneuver and the associated command in the maneuver database; and transmitting the command to the computing device via the communication module.

25 Claims, 10 Drawing Sheets

TOUCH SENSITIVE SYSTEM AND STYLUS FOR COMMANDING BY MANEUVERING AND METHOD THEREOF

CROSS REFERENCES TO RELATED APPLICATIONS

The present invention claims priority benefit of U.S. provisional patent application No. 62/251,205, filed on Nov. 5, 2015.

FIELD OF THE INVENTION

The present invention relates to a touch sensitive system, and more particularly, to a touch sensitive system and stylus for commanding by maneuvering and method thereof.

BACKGROUND OF THE INVENTION

Stylus is one of the important human-machine interfaces in modern electronic products. For example, tablet PCs and mobile phones such as those found in the Samsung Galaxy Note series and in the Microsoft Surface Series are equipped with styli for more accurate input.

As the tip of a stylus is generally smaller than a human's fingertip, more accurate input actions can be carried out, which is often applied to drawing or retouching software. In the above software, a curser can be converted into a variety of input tools to simulate, for example, a writing tool such as a pencil, a brush or a pen; an eraser or a smudge tool of various sizes; or even a color gun or a paint brush. Generally speaking, when choosing an input tool, there are three aspects a user needs to select: one is the type of tools; second is the size of the tool; and third is the color represented by the tool. For example, when a brush tool is to be selected, the size of the brush tip and the ink color should also be chosen.

Every time a new input tool is to be selected, the user usually has to click and select the above options in order to change the above properties. In other words, the user usually has to use the stylus to click on the menu, or possibly with the combination of inputs by keyboards or fingers, to carry out the procedure for selecting the properties of an input tool. During this process, the stylus may accidently click somewhere in the drawing area and unintentionally change the appearance of the drawing. If the user has noticed this mistake, then the error can be corrected. However, if the user overlooks the mistake and later saves the file, the error will be kept in the drawing area.

Therefore, the present application endeavors to find a solution that allows the user's hand to stay on the stylus, and allows a cursor corresponding to the stylus to stay in the drawing area while changing the tool options corresponding to the stylus.

SUMMARY OF THE INVENTION

One characteristic of the present application is in that at least one cursor property corresponding to the stylus is modified based on the stylus body posture data detected by the sensor(s) on the stylus.

Another characteristic of the present application is in that at least a characteristic of a computing device corresponding to the stylus or a command made to the computing device is modified based on the stylus body posture data detected by the sensor(s) on the stylus.

The present invention provides a stylus for commanding by maneuvering, which may include: a communication module connected to a computing device, wherein the computing device includes a touch sensitive panel for detecting the location of the stylus on or near the touch sensitive panel; at least one posture sensor; a memory for storing a maneuver database that includes a plurality of maneuvers, each with associated one or more sets of moving vectors and a command; and a stylus processor for receiving a movement trajectory from the posture sensor to calculate one or more sets of moving vectors, determining the associated maneuver and the associated command, and transmitting the command to the computing device via the communication module.

The present invention provides a touch sensitive system for commanding by maneuvering, which may include: a stylus including: a communication module connected to a computing device; at least one posture sensor; a memory for storing a maneuver database that includes a plurality of maneuvers, each with associated one or more sets of moving vectors and a command; and a stylus processor for receiving a movement trajectory from the posture sensor to calculate one or more sets of moving vectors, determining the associated maneuver and the associated command, and transmitting the command to the computing device via the communication module. The touch sensitive system may further include the computing device, wherein the computing device includes a touch sensitive panel for detecting the location of the stylus on or near the touch sensitive panel, wherein the computing device executes the command after receiving it.

The present invention provides a touch sensitive method for commanding by maneuvering applicable to a stylus. The touch sensitive method includes the following steps of: receiving a movement trajectory from at least one posture sensor of the stylus; calculating one or more sets of moving vectors based on the movement trajectory; determining an associated maneuver and an associated command in a maneuver database based on the calculated one or more sets of moving vectors; and transmitting the command to a computing device via a communication module of the stylus, wherein the computing device includes a touch sensitive panel for detecting the location of the stylus on or near the touch sensitive panel.

The present invention provides a touch sensitive system for commanding by maneuvering, which may include a stylus. The stylus may include: at least one posture sensor; and a communication module for transmitting a movement trajectory sensed by the posture sensor to a computing device. The touch sensitive system further includes the computing device, which may include: a touch sensitive panel for detecting the location of the stylus on or near the touch sensitive panel; a memory for storing a maneuver database that includes a plurality of maneuvers, each with associated one or more sets of moving vectors and an associated command; and a processor for receiving the movement trajectory from the posture sensor to calculate one or more sets of moving vectors, determining the associated maneuver and the associated command in the maneuver database based on the calculated one or more sets of moving vectors, and executing the command.

The present invention provides a touch sensitive method for commanding by maneuvering applicable to a touch sensitive system including a stylus and a computing device. The touch sensitive method may include the following steps of: the stylus transmitting a movement trajectory sensed by a posture sensor to the computing device via a communication module; the computing device receiving the movement trajectory from the posture sensor to calculate one or more sets of moving vectors; the computing device determining an associated maneuver and an associated command in a maneuver database based on the calculated one or more sets of moving vectors; and the computing device executing the command.

The present invention provides a touch sensitive system for commanding by maneuvering, which may include a stylus. The stylus may include: at least one posture sensor; a communication module connected to a computing device; a stylus memory for storing a stylus maneuver database that includes a plurality of maneuvers, each with associated one or more sets of moving vectors; and a stylus processor for receiving the movement trajectory from the posture sensor to calculate one or more sets of moving vectors, determining an associated maneuver based on the calculated one or more sets of moving vectors, and transmitting the maneuver to the computing device via the communication module. The touch sensitive system may further include the computing device, which includes: a touch sensitive panel for detecting the location of the stylus on or near the touch sensitive panel; a computing device memory for storing a computing device maneuver database that includes a plurality of maneuvers, each with an associated command; and a computing device processor for receiving the maneuver and determining its associated command in the computing device maneuver database based on the maneuver, and executing the command.

The present invention provides a touch sensitive method for commanding by maneuvering applicable to a touch sensitive system including a stylus and a computing device. The touch sensitive method may include the following steps of: receiving a movement trajectory from at least one posture sensor of the stylus; calculating one or more sets of moving vectors based on the movement trajectory; determining an associated maneuver in a stylus maneuver database based on the calculated one or more sets of moving vectors; the stylus transmitting the maneuver to the computing device via a communication module, wherein the computing device includes a touch sensitive panel for detecting the location of the stylus on or near the touch sensitive panel; the computing device determining an associated command based on the received maneuver; and the computing device executing the command.

Accordingly, with the stylus and the touch sensitive method and system provided by the present invention, the user's hand is allowed to stay on the stylus and the cursor corresponding to the stylus is allowed to stay in the drawing area while changing the tool options corresponding to the stylus, or making a command to the computing device. As such, work efficiency of the user can be increased, while reducing fatigue of the user and even reducing the possibility of work injury.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1:
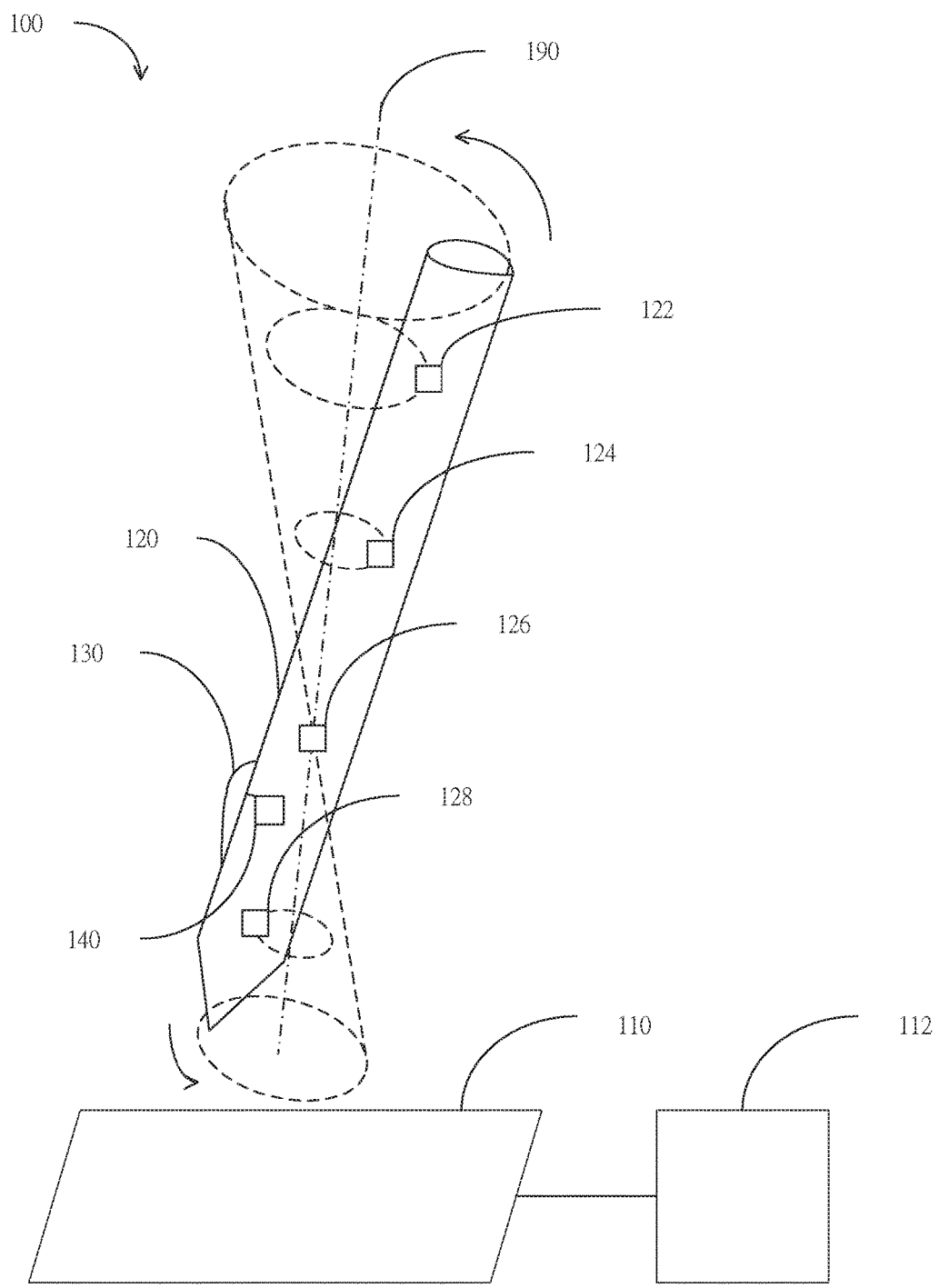
FIG. 1 is a schematic diagram depicting a touch sensitive system in accordance with an embodiment of the present invention.

Referring to FIG. 1, a schematic diagram illustrating a touch sensitive system in accordance with an embodiment of the present invention is shown. The touch sensitive system 100 includes a touch sensitive panel 110, a computing device 112 connected with the touch sensitive panel 110 and at least one stylus 120. The touch sensitive panel 110 is used for detecting the location of the touch or the approaching (also termed "touch/proximity" hereinafter) of the stylus 120, and reporting this touch/proximity location to the computing device 112. After receiving the touch/proximity location, the computing device 112 then moves the corresponding cursor location. The computing device 112 may include a processor for executing the above drawing or retouching software, a memory, or other necessary elements. The computing device 112 can be a table PC, a mobile phone, a laptop computer, a desktop computer, or etc.

In some embodiments, the touch sensitive panel 110 does not include a display screen. The computing device 112 includes and controls a display screen. In other embodiments, the touch sensitive panel 110 includes a display screen, and the computing device 112 controls the display screen of the touch sensitive panel 110. For simplicity, the touch sensitive panel 110 described in the present application may refer to a touch sensitive panel without a display or a touch screen.

In one embodiment, the stylus 120 may be provided with at least one sensor for detecting posture data of the body of the stylus 120, and the sensor(s) are connected to a stylus processor 140. The term "posture data" may refer to a posture of the stylus 120 with respect to a reference coordinate system. A first axis of the reference coordinate system may correspond to the long axis of the touch sensitive panel 110. A second axis of the reference coordinate system may correspond to the short axis of the touch sensitive panel 110. The first and second axes can be interchanged, and they form the surface of the touch sensitive panel 110. A third axis of the reference coordinate system may correspond to a vertical axis on the surface of the touch sensitive panel 110. The origin of the reference coordinate system can be designated to a point on the surface of the touch sensitive panel 110. For example, the origin may be any one of the four corners of the touch sensitive panel 110, or a point on the touch sensitive panel 110 vertically projected along the third axis from the tip of the stylus 120, in other words, the touch/proximity location of the stylus 120 detected by the touch sensitive panel 110. However, the above descriptions related to the reference coordinate system are merely one of a number of possible examples. For example, the east-west direction of the location of the stylus 120 can be considered as the first axis of the reference coordinate system; the north-south direction thereof as the second axis; and the altitude thereof as the third axis. The body of the stylus 120 itself can be considered as a body vector corresponding to the reference coordinate system. For example, from the tail to the head of the stylus 120, or vice versa. The posture data of the stylus 120 at a particular instance can be represented by the body vector.

The above sensor(s) may be gyroscope(s), accelerometer(s), angular accelerometer(s) and/or other device(s) for sensing the stylus body posture data. As shown in FIG. 1, the stylus 120 includes four sensors 122, 124, 126 and 128 located at different locations of the stylus body.

In some embodiments, the above sensors may include a plurality of antennae for receiving external electromagnetic waves to determine the posture of the stylus body based on data such as strengths, phases, time differences, and etc. of the received electromagnetic waves. In an example, the tip of the stylus 120 includes a plurality of electrodes for sensing a touch control driving signal transmitted by the touch sensitive panel 110, and the posture of the stylus body is then determined based on data such as strengths, phases, time differences, and etc. of the electromagnetic waves received by each of the electrodes. In an example, the data that can be obtained by the above sensors include 3D moving vector information and/or 3-axis rotational information. In an example, these data include movement information with respect to the perpendicular X axis (east-west axis), Y axis (south-north axis), and Z axis (altitude axis) of the reference coordinate system within a unit of time, it may also include rotational information with respect to a pitch axis, a roll axis and a yaw axis within a unit of time.

As shown in FIG. 1, when a user is holding the stylus 120 while rotating the stylus 120 anticlockwise around an axis 190, a movement trajectory of each of the sensors 122, 124, 126 and 128 are similarly circles or ellipses. The stylus processor 140 can be used to store the movement trajectories of the sensors 122, 124, 126 and 128.

It should be noted that the term "movement trajectory" used in the present application refers to a movement trajectory of or derived from a collection of sensor data. A plurality of continuous movement trajectories of each sensor may include one or more maneuvers performed by the stylus 120. Based on the sensor data of each sensor, one or more sets of moving vectors can be formed. Each set of the moving vectors may represent the change in the posture of the stylus 120 between two instances in time. For example, each set of moving vectors may include 3-axis movement information and/or 3-axis rotational information with respect to a particular point. This particular point may be the origin of the aforementioned coordinate system, or a particular point on the stylus 120. These moving vectors can be combined to form a movement trajectory of each sensor. In other words, a maneuver may include one or more sets of continuous or non-continuous moving vectors. In an embodiment, in addition to the moving vectors, a maneuver may also include the state of a sensor on the stylus 120, for example, the states of a button being pushed or not. However, the present application does not limit the movement trajectory to include only moving vectors; rather this term is used to refer to all or some of the sensor data per se and/or information derived using these sensor data. One with ordinary skill in the art can appreciate that, in actual practice, different sensors can be used, and the accuracy, speed, data type or other characteristics of the data returned by each sensor may all be different; the process or steps in regard to this aspect can be made in accordance with well-known practices.

In one embodiment, the stylus 120 may further include a sensor 130 connected to the stylus processor 140 for indicating to the stylus processor 140 as to when to start and stop recording the movement trajectory of each sensor. In one example, the sensor 130 can be any type of sensor, such as a button, a touch sensitive switch, or a photo-interrupter switch. When the user touches the sensor 130, the stylus processor 140 then asks the sensors to record and report their movement trajectories. When the user has stopped touching the sensor 130, the stylus processor 140 then asks the sensors to stop recording and to stop reporting their movement trajectories.

In an embodiment, the sensor 130 may be a pressure sensor at the tip of the stylus. When the stylus tip is under pressure, that is, the stylus 120 is in contact with the touch sensitive panel 110, the stylus processor 140 asks the sensors to not record and to report their movement trajectories. On the other hand, when the stylus tip is not under pressure, that is, the stylus 120 is not in contact with the touch sensitive panel 110, the stylus processor 140 asks the sensors to record and report their movement trajectories.

In another embodiment, the sensor 130 may be an electrical signal sensor connected to the tip of the stylus. When the stylus tip is touching/approaching the touch sensitive panel 110, the electrical signal sensor receives electrical signals sent from the touch sensitive panel 110, and the stylus processor 140 asks the sensors to not record and report their movement trajectories. On the other hand, when the stylus tip is not touching/approaching the touch sensitive panel 110, the electrical signal sensor does not receive electrical signals from the touch sensitive panel 110, i.e. the stylus 120 is not touching/approaching the touch sensitive panel 110, then the stylus processor 140 asks the sensors to record and report their movement trajectories.

In yet another embodiment, the stylus 120 may include no sensor 130, and continuously asks each sensor to record and report the last movement trajectory.

In one embodiment, when all sensors 130 report no movements, the stylus processor 140 may ask the sensors to stop recording and to stop reporting their movement trajectories. On the other hand, when the stylus processor 140 is not recording the movement trajectories of the sensors, at least one sensor 130 starts to detect movements, it then notifies the stylus processor 140. Once the stylus processor 140 is notified, it then asks every sensor to record and report their last movement trajectories.

When the stylus processor 140 stops recording the movement trajectories, or is notified by a periodical interrupt signal during continuous recording of the sensors' movement trajectories, the stylus processor 140 may perform comparisons between the movement trajectories recorded by each of the sensors in order to determine the continuous posture data (or maneuver) of the stylus 120 itself. As shown in FIG. 1, the elliptical movement trajectory of the sensor 122 is compared with that of the sensor 124, and it is determined that the long axis and short axis of the former are both longer than those of the latter. The sensor 126 has no movement. The movement trajectory of the sensor 128 is also elliptical. Therefore, the stylus processor 140 is able to determine that the stylus 120 performed rotation movement around the axis 190, and the intersection of the stylus 120 and the axis 190 is at or near the sensor 126.

If the stylus processor 140 is to identify the movement of the stylus 120 shown in FIG. 1, it would be difficult to rely on just one sensor. Assuming the stylus 120 includes only one of the sensors 122, 124 and 128, based on its movement trajectory, the stylus processor 140 can only determine the stylus 120 rotated overall about the axis 190 overall, but fails to recognize the intersection of the stylus 120 and the axis 190 is at or near the sensor 126. Assuming the stylus 120 includes only the sensors 122 and 128, or the sensors 126 and 128, the stylus processor 140 can only determine the stylus 120 rotated overall about axis 190 without knowing the intersection of the stylus 120 and the axis 190 is at or near the sensor 126.

As for the stylus processor 140, more sensors it has, the more variety of movements it is able to recognize, but the present invention is not limited to the use of multiple sensors, a single sensor may well be used. Assuming the stylus 120 includes only the sensor 126, then the sensor 126, as shown in the embodiment of FIG. 1, can experience rolling rates in all three axes, so the stylus processor 140 can recognize that the stylus 120 rotates around the axis 190.

In an embodiment, the stylus processor 140 includes a memory containing a maneuver database. When sensor information of one or more sensors is collected, the stylus processor 140 may combine these sensor information into one or more movement trajectories, and then determine that a particular maneuver was made by the stylus 120 based on the movement trajectories
with the various maneuvers in the database.

Figure 2:
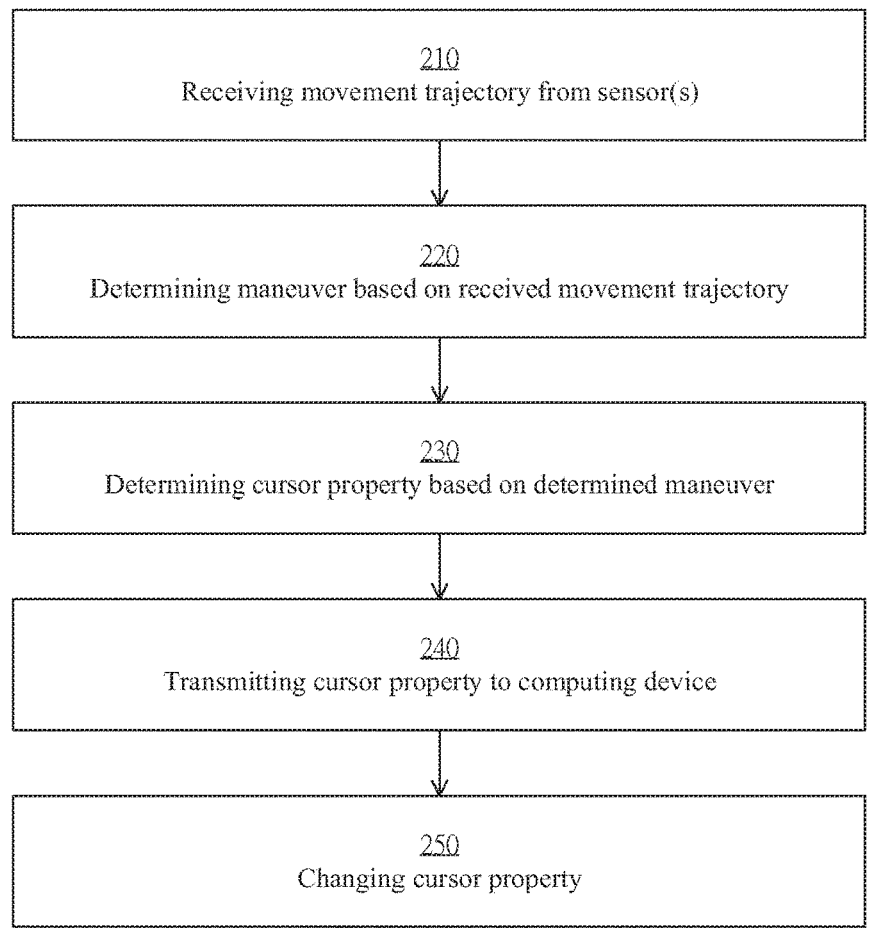
FIG. 2 is a flowchart illustrating changing of a cursor property in accordance with an embodiment of the present invention.

Referring to FIG. 2, a flowchart illustrating a process for changing a cursor property in accordance with an embodiment of the present invention is shown. The following descriptions can be made with reference to the embodiment shown in FIG. 1. In step 210, a movement trajectory or trajectories of one or more sensors are received by the stylus processor 140. Next, the stylus processor 140 can determine a maneuver made by the stylus 120 based on the data in the above maneuver database in step 220. Then, in step 230, similarly using the maneuver database, the stylus processor 140 can determine a corresponding cursor property based on the determined maneuver. As described before, a particular maneuver may correspond to the adjusting or changing of a cursor property, such as the tool type, tool size and/or tool color etc.

After determining the corresponding cursor property, in step 240 of FIG. 2, the stylus processor 140 has to transmit the cursor property to the computing device 112. In an embodiment, the stylus processor 140 may transmit the cursor property to the touch sensitive panel 110 via the electrical signal transmitted at the stylus tip, and the computing device 112 connected to the touch sensitive panel 110 may then analyze the electrical signal received by the touch sensitive panel 110 to determine the cursor property. In another embodiment, the stylus processor 140 may transmit the cursor property to the touch sensitive panel 110 through a wireless or wired connection. For example, the stylus 120 itself may be equipped with a wireless communication module capable of Bluetooth, WiFi, Ultra Wide Broadband communication and the like, which can be connected with a wireless communication module on the computing device 112. The stylus processor 140 may transmit the cursor property to the computing device 112 via the above wireless link. In another example, the stylus 120 itself is equipped with a wired communication module, such as a RS-232 serial communication port, a RS-422 serial communication port, a Universal Serial Bus (USB) and the like, which can be connected with a wired communication module on the computing device 112. The stylus processor 140 may transmit the cursor property to the computing device 112 via the above wired link. Finally, after receiving the cursor property, the computing device 112 changes the cursor property in step 250.

In the embodiment of FIG. 2, the stylus 120 may further include an indication module for indicating to the user that a particular task is completed. The indication module may include an audio and/or visual effect module. The audio module can produce a sound. The visual effect module can produce a light. When a particular maneuver is determined in step 220, the indication module sends out an indication to indicate the completion of step 220. In an example, the above indication may be related to the determined maneuver. For example, when a first type of maneuver is determined, a first type of audio and/or visual effect is outputted. When a second type of maneuver is determined, a second type of audio and/or visual effect is outputted.

In addition to outputting an indication after the step 220 is completed, an indication can be sent out upon the completion of the step 230. When a first type of cursor property is determined, a first type of audio and/or visual effect is outputted. When a second type of cursor property is determined, a second type of audio and/or visual effect is outputted. In an embodiment, the computing device 112 may also include an indication module for sending out an indication upon the completion of step 250. In order to avoid confusion, the total number of indications outputted for the steps 220, 230 and 250 is limited to just one. For example, when the step 250 is set to output an indication upon completion, the completions of the step 220 and 230 will not trigger an indication output. That is, if the completion of a particular step is set to trigger an indication, then the completions of other steps will not.

Figure 3:
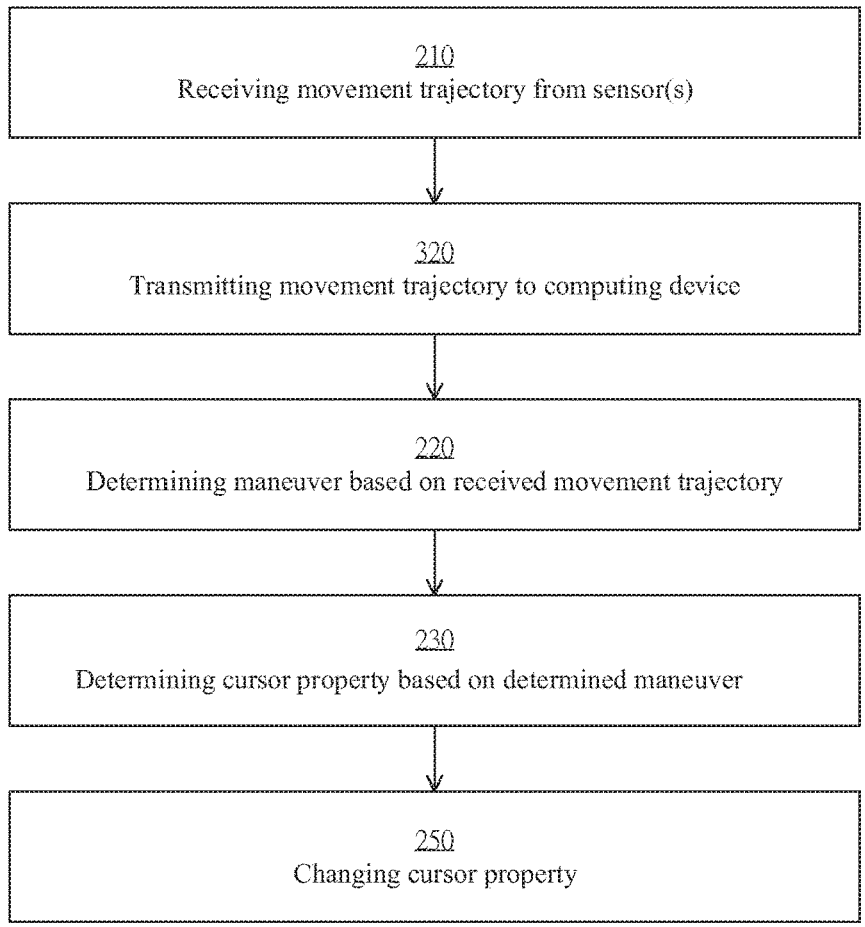
FIG. 3 is a flowchart illustrating changing of a cursor property in accordance with another embodiment of the present invention.

Referring to FIG. 3, a flowchart illustrating a process for changing a cursor property in accordance with another embodiment of the present invention is shown. The following descriptions can be made with reference to the embodiments shown in FIGS. 1 and 2. Compared to FIG. 2, the embodiment shown in FIG. 3 is different after step 210, where the stylus processor 140 transmits the movement trajectory to the computing device 112 through the wired or wireless communication module, as shown in step 320. Thereafter, the computing device 112 performs the above steps 220, 230 and 250 as described before.

One advantage of the embodiment of FIG. 3 is that, the computing device 112 determines the maneuver and the cursor property, so it would be easier to modify the settings of the maneuver database contained in the computing device 112. Moreover, the computer resources of the computing device 112 will be much more powerful than that of the stylus processor 140, and the consumed power can be more easily replenished. One disadvantage is that the data quantity of a movement trajectory is larger than that of a cursor property. A high transmission capability may be required to implement the embodiment of FIG. 3.

Figure 4:
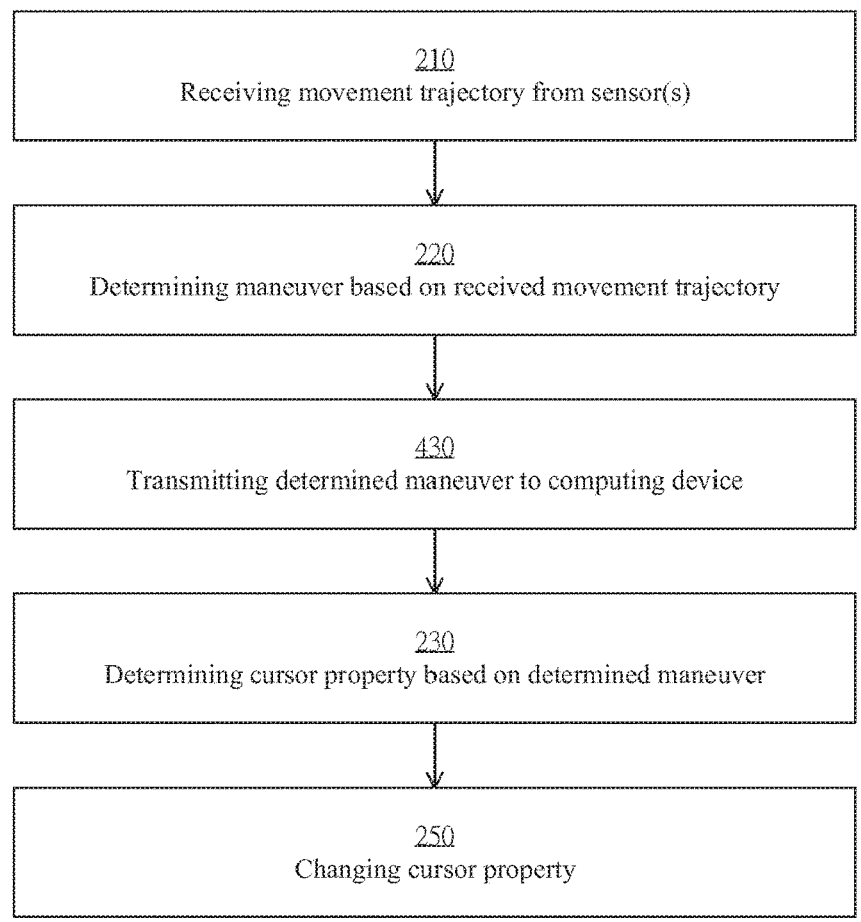
FIG. 4 is a flowchart illustrating changing of a cursor property in accordance with another embodiment of the present invention.

Referring to FIG. 4, a flowchart illustrating a process for changing a cursor property in accordance with still another embodiment of the present invention is shown. The following descriptions can be made with reference to the embodiments shown in FIGS. 1 and 2. Compared to FIG. 2, the embodiment shown in FIG. 4 is different after step 220, where the stylus processor 140 transmits the determined maneuver to the computing device 112 through the wired or wireless communication module, as shown in step 430. Thereafter, the computing device 112 performs the above steps 230 and 250 as described before. The embodiment of FIG. 4 provides a compromise between the embodiments of FIGS. 2 and 3.

Although in the descriptions above the maneuver of the stylus is used for changing at least one cursor property corresponding to the stylus, at least one property of the computing device corresponding to the stylus or a command made to the computing device can also be changed based on the stylus body posture data detected by the sensor(s) on the stylus.

As an example, the above property may be the adjustment of the brightness of the display screen, the volume of the audio module, the switch of a device, etc. The command may be equivalent to pressing a particular directional keypad, pressing a particular command key on the mouse, or even initiating a corresponding application program.

In an embodiment, the stylus 120 may include at least one specific sensor, such as an eraser button and/or a special-purpose button. When the user presses the specific sensor while maneuvering the stylus, a different cursor property, computing device property, or computing device command can be selected.

For example, while performing the maneuvering shown in FIG. 1, an undepressed specific sensor represents the issuance of an "Undo" command to an application, whereas when the specific sensor is pressed while performing the maneuvering shown in FIG. 1, this represents the issuance of a "Redo" command to the application.

Figure 5:
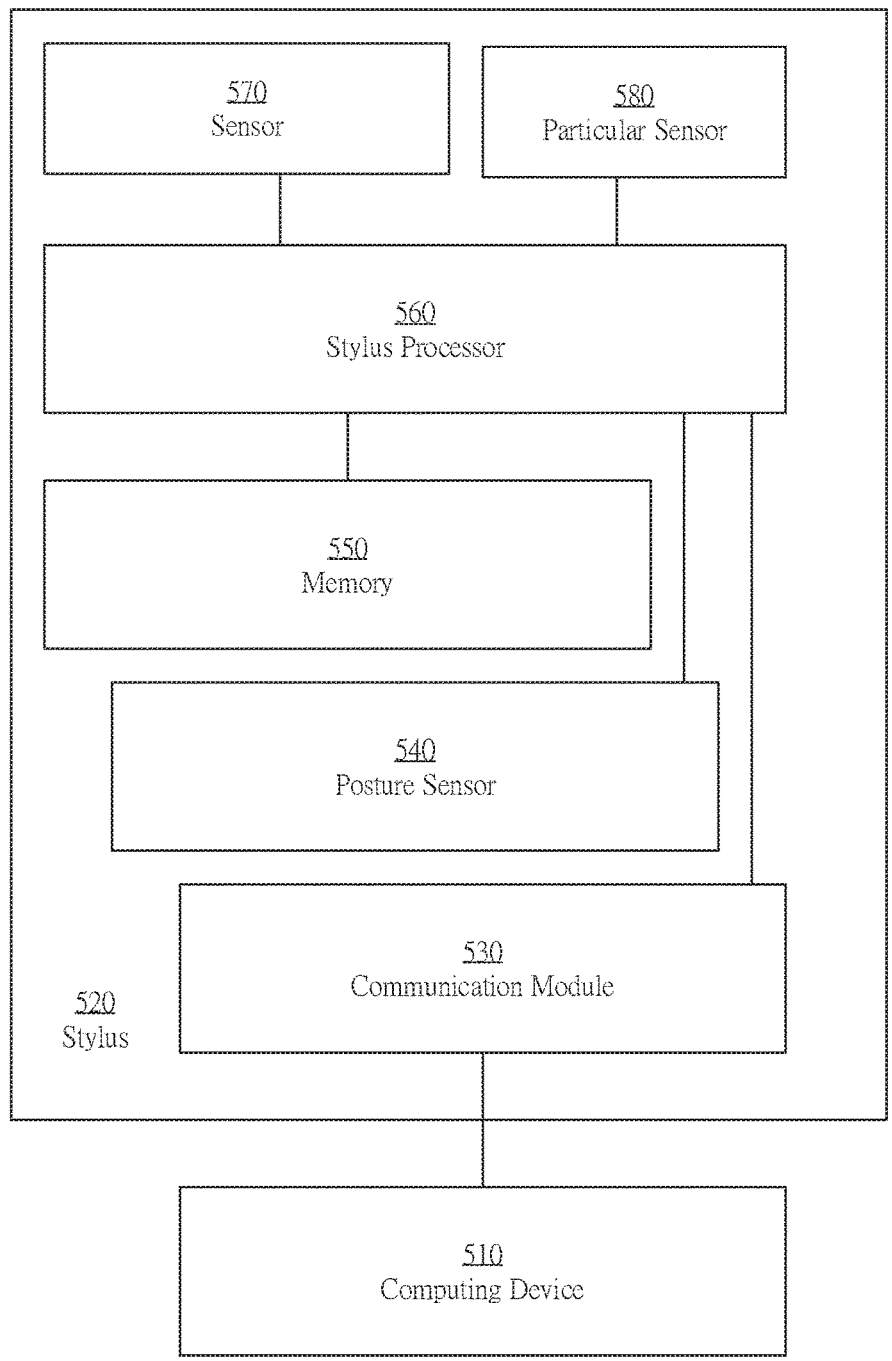
FIG. 5 is a schematic block diagram depicting a stylus in accordance with an embodiment of the present invention.

In FIG. 5, a schematic block diagram depicting a stylus in accordance with an embodiment of the present invention is shown. In this embodiment, a stylus 520 for commanding by maneuvering, which includes: a communication module 530 connected to a computing device 510, wherein the computing device 510 includes a touch sensitive panel for detecting the location of the stylus 520 on or near the touch sensitive panel; at least one posture sensor 540; a memory 550 for storing a maneuver database that includes a plurality of maneuvers, each with associated one or more sets of moving vectors and an associated command; and a stylus processor 560 for receiving a movement trajectory from the posture sensor 540 to calculate one or more sets of moving vectors, determining the associated maneuver and the associated command, and transmitting the command to the computing device via the communication module 530.

In order to describe the implementations of the moving vectors, in one embodiment, each set of moving vectors includes any combination of the following messages with respect to a reference coordinate system from the posture sensor 540: a three-axis moving message; and a three-axis rotational message. In order to describe the implementations of the moving vectors in the context of the stylus 520 and the computing device 510, in an embodiment, a first axis of the reference coordinate system corresponds to the long axis of the touch sensitive panel; a second axis of the reference coordinate system corresponds to the short axis of the touch sensitive panel; and a third axis of the reference coordinate system corresponds to the vertical axis with respect to the surface of the touch sensitive panel. In order to describe that some maneuvers are not made up of continuous movement trajectories, and that the moving vectors indicate that the maneuvers do not care where the origins of the coordinate system of the movements are but rather the relative movement trajectories, in an embodiment, when a maneuver includes multiple sets of moving vectors, at least two sets of the moving vectors in the multiple sets of moving vectors are not continuous in time. For example, when describing the rotational movement of the sensor 122 shown in FIG. 1, only four sets of moving vectors in the directions of east, west, south and north are required, instead of moving vectors of east-south-west-north or moving vectors of east-north-west-south. In order to prevent the contents of the maneuver database being too large, in an embodiment, a calculated moving vector is considered to be a particular moving vector in the maneuver database when the difference between the two is within a limit.

In order to signal to the stylus processor 560 as to when to start determining maneuvers, the stylus includes a sensor 570 for signaling to the stylus processor 560 to perform one of the following steps of: starting receiving a movement trajectory from the posture sensor 540; stopping receiving a movement trajectory from the posture sensor 540; asking the posture sensor 540 to start sensing a movement trajectory; and asking the posture sensor 540 to stop sensing a movement trajectory. In order to describe the implementations of the sensor 570, the sensor 570 includes one of the following: a button, a touch sensitive switch, a photo-interrupter switch, a pressure sensor at the tip of the stylus, and an electrical signal sensor at the tip of the stylus. In order to conserve energy, when the posture sensor 540 reports no movements for a certain period of time, the stylus processor 560 asks the posture sensor 540 to stop sensing movement trajectories.

In order to describe when a maneuver is determined so as to reduce the computational resources used, in an embodiment, when the stylus processor 560 has stopped receiving the movement trajectories from the posture sensor 540, or when the stylus processor 560 is periodically interrupted by an interrupt signal, the stylus processor 560 then determines the associated maneuver and the associated command from the maneuver database based on the calculated one or more sets of moving vectors.

In order to describe the purpose of the command, in an embodiment, the command includes one of the following commands to the computing device 510: changing a property of a cursor; changing the type of a tool to which the cursor corresponds; changing the size of a tool to which the cursor corresponds; changing the color of a tool to which the cursor corresponds; changing the brightness of a display of the computing device; changing the volume of an audio module of the computing device; turning on/off of a device in the computing device; pressing of a key or a combination of keys on a keyboard; operating a mouse in a certain way; activating an application and etc. In order to increase the diversity of the command, in an embodiment, the stylus 520 further includes a particular sensor 580, when the state of which changes, the same maneuver corresponds to different commands before and after the change.

In order to describe the implementations of the communication module, in an embodiment, the communication module 530 includes one of the following: a wired communication module connected to the computing device via a physical wire; a wireless communication module connected to the computing device via a wireless transmission connection; and a tip section of the stylus that connects to the computing device by sending electrical signals to the touch sensitive panel.

In the embodiment shown in FIG. 5, the present invention provides a touch sensitive system for commanding by maneuvering, which includes a stylus 520. The stylus 520 includes: a communication module 530 connected to a computing device 510; at least one posture sensor 540; a memory 550 for storing a maneuver database that includes a plurality of maneuvers, each with associated one or more sets of moving vectors and an associated command; and a stylus processor 560 for receiving a movement trajectory from the posture sensor 540 to calculate one or more sets of moving vectors, determining the associated maneuver and the associated command, and transmitting the command to the computing device via the communication module 530. The touch sensitive system further includes the computing device 510, wherein the computing device 510 includes a touch sensitive panel for detecting the location of the stylus 520 on or near the touch sensitive panel, wherein the computing device 510 executes the command after receiving it.

Figure 6:
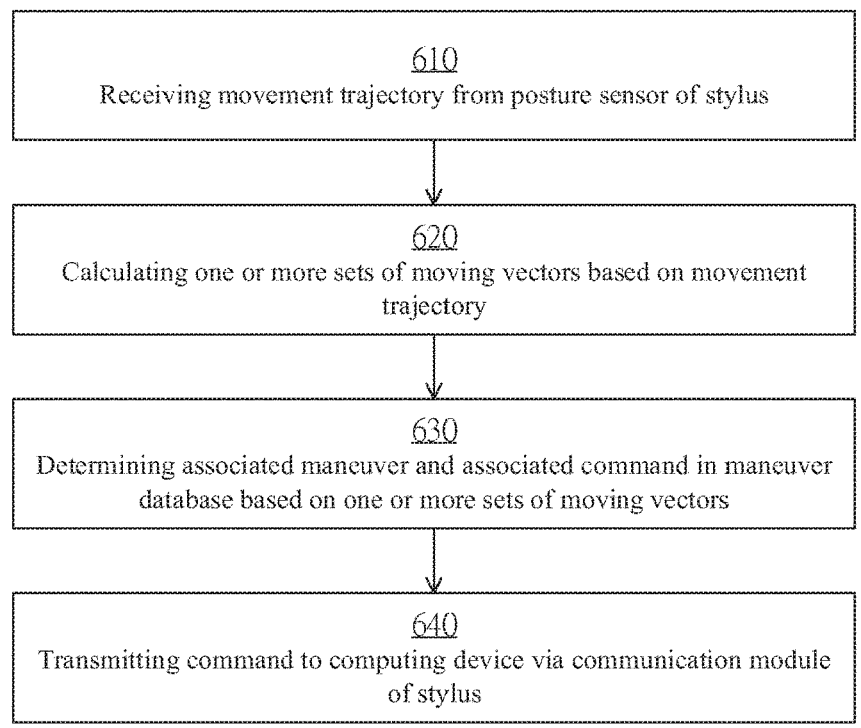
FIG. 6 is a flowchart illustrating a touch sensitive method in accordance with an embodiment of the present invention.

FIG. 6 is a flowchart illustrating a touch sensitive method in accordance with an embodiment of the present invention. This embodiment provides a touch sensitive method for commanding by maneuvering applicable to a stylus. The touch sensitive method includes: in step 610, receiving a movement trajectory from at least one posture sensor of the stylus; in step 620, calculating one or more sets of moving vectors based on the movement trajectory; in step 630, determining an associated maneuver and an associated command in a maneuver database based on the calculated one or more sets of moving vectors; and in step 640, transmitting the command to a computing device via a communication module of the stylus, wherein the computing device includes a touch sensitive panel for detecting the location of the stylus on the touch sensitive panel.

In order to describe the implementations of the moving vectors, in one embodiment, each set of moving vectors includes any combination of the following messages with respect to a reference coordinate system from the posture sensor: a three-axis moving message; and a three-axis rotational message. In order to describe the implementations of the moving vectors in the context of the stylus and the computing device, in an embodiment, a first axis of the reference coordinate system corresponds to the long axis of the touch sensitive panel; a second axis of the reference coordinate system corresponds to the short axis of the touch sensitive panel; and a third axis of the reference coordinate system corresponds to the vertical axis with respect to the surface of the touch sensitive panel. In order to describe that some maneuvers are not made up of continuous movement trajectories, and that the moving vectors indicate that the maneuvers do not care where the origins of the coordinate system of the movements are, but rather the relative movement trajectories, in an embodiment, when a maneuver includes multiple sets of moving vectors, at least two sets of the moving vectors in the multiple sets of moving vectors are not continuous in time. For example, when describing the rotational movement of the sensor 122 shown in FIG. 1, only four sets of moving vectors in the respective directions of east, west, south and north are required, instead of moving vectors of east-south-west-north or moving vectors of east-north-west-south. In order to prevent the contents of the maneuver database being too large, in an embodiment, a calculated moving vector is considered to be a particular moving vector in the maneuver database when the difference between the two is within a limit.

In order to signal to the stylus processor as to when to start determining maneuvers, the touch sensitive method further includes receiving the state of a sensor on the stylus, and performing one of the following steps based on the state of the sensor: starting receiving a movement trajectory from the posture sensor; stopping receiving a movement trajectory from the posture sensor; asking the posture sensor to start sensing a movement trajectory; and asking the posture sensor to stop sensing a movement trajectory. In order to describe the implementations of the sensor, the sensor includes one of the following: a button, a touch sensitive switch, a photo-interrupter switch, a pressure sensor at the tip of the stylus, and an electrical signal sensor at the tip of the stylus. In order to conserve energy, when the posture sensor reports no movements for a certain period of time, the stylus processor asks the posture sensor to stop sensing movement trajectories.

In order to describe when a maneuver is determined so as to reduce the computational resources used, in an embodiment, when the stylus processor has stopped receiving movement trajectories from the posture sensor, or when the stylus processor is periodically interrupted by an interrupt signal, the step of determining the associated maneuver and command from the maneuver database based on the calculated one or more sets of moving vectors is performed.

In order to describe the purpose of the command, in an embodiment, the command includes one of the following commands to the computing device: changing a property of a cursor; changing the type of a tool to which the cursor corresponds; changing the size of a tool to which the cursor corresponds; changing the color of a tool to which the cursor corresponds; changing the brightness of a display of the computing device; changing the volume of an audio module of the computing device; turning on/off of a device in the computing device; pressing of a key or a combination of keys on a keyboard; operating a mouse in a certain way; activating an application and etc. In order to increase the diversity of the command, in an embodiment, the stylus further includes a particular sensor, when the state of which changes, the same maneuver corresponds to different commands before and after the change.

In order to describe the implementations of the communication module, in an embodiment, the communication module includes one of the following: a wired communication module connected to the computing device via a physical wire; a wireless communication module connected to the computing device via a wireless transmission connection; and a tip section of the stylus that connects to the computing device by sending electrical signals to the touch sensitive panel.

Figure 7:
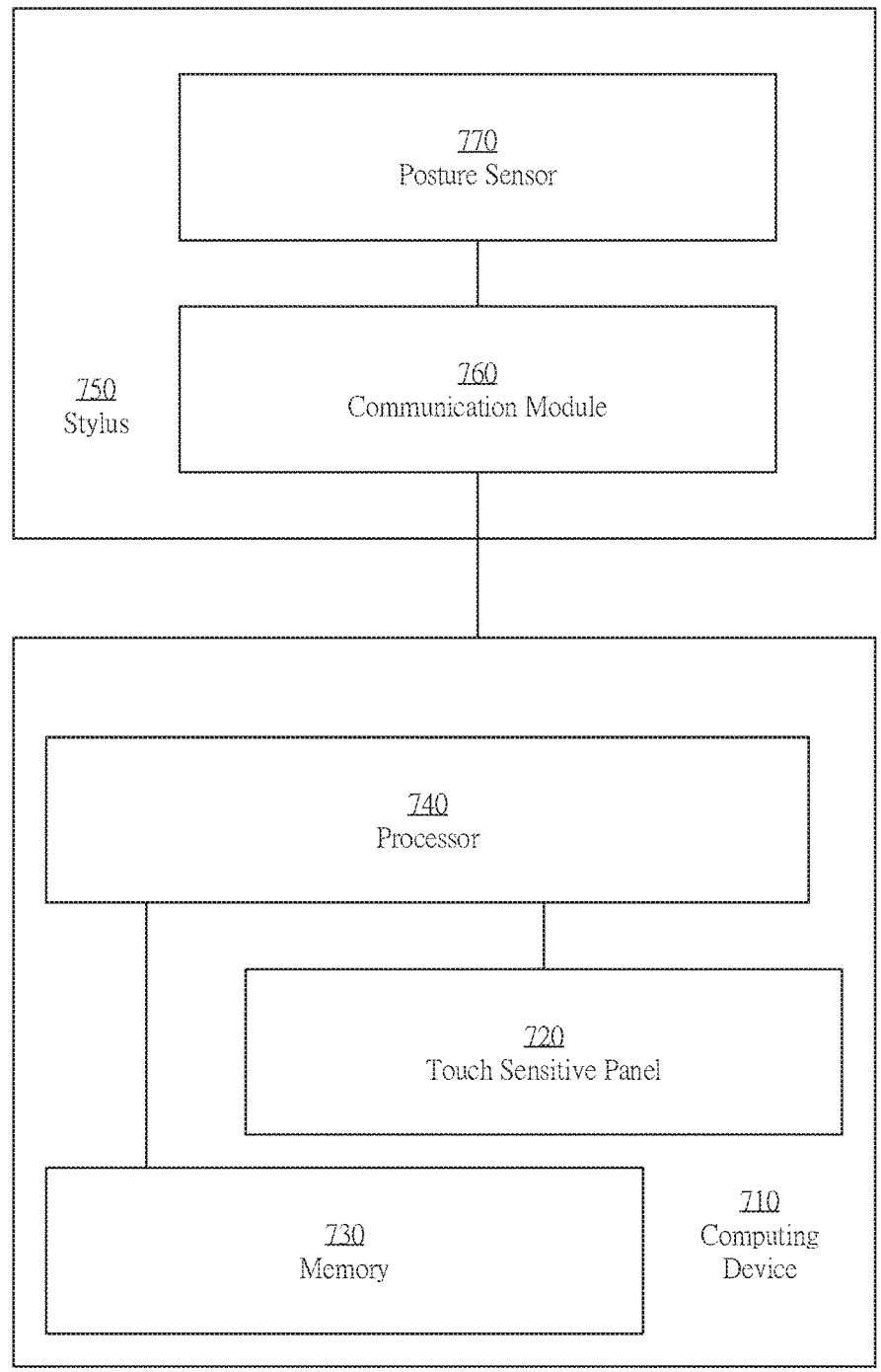
FIG. 7 is a schematic block diagram depicting a touch sensitive system in accordance with an embodiment of the present invention.

FIG. 7 is a schematic block diagram depicting a touch sensitive system in accordance with an embodiment of the present invention. This embodiment provides a touch sensitive system for commanding by maneuvering, which includes a stylus 750. The stylus 750 includes: at least one posture sensor 770; and a communication module 760 for transmitting a movement trajectory sensed by the posture sensor 770 to a computing device 710. The touch sensitive system further includes the computing device 710, which includes: a touch sensitive panel 720 for detecting the location of the stylus 750 on or near the touch sensitive panel 710; a memory 730 for storing a maneuver database that includes a plurality of maneuvers, each with associated one or more sets of moving vectors and an associated command; and a processor 740 for receiving the movement trajectory from the posture sensor 770 to calculate one or more sets of moving vectors, determining the associated maneuver and the associated command in the maneuver database based on the calculated one or more sets of moving vectors, and executing the command.

In order to describe the implementations of the moving vectors, in one embodiment, each set of moving vectors includes any combination of the following messages with respect to a reference coordinate system from the posture sensor 770: a three-axis moving message; and a three-axis rotational message. In order to describe the implementations of the moving vectors in the context of the stylus 750 and the computing device 710, in an embodiment, a first axis of the reference coordinate system corresponds to the long axis of the touch sensitive panel; a second axis of the reference coordinate system corresponds to the short axis of the touch sensitive panel; and a third axis of the reference coordinate system corresponds to the vertical axis with respect to the surface of the touch sensitive panel. In order to describe that some maneuvers are not made up of continuous movement trajectories, and that the moving vectors indicate that the maneuvers do not care where the origins of the coordinate system of the movements are, but rather the relative movement trajectories, in an embodiment, when a maneuver includes multiple sets of moving vectors, at least two sets of the moving vectors in the multiple sets of moving vectors are not continuous in time. For example, when describing the rotational movement of the sensor 122 shown in FIG. 1, only four sets of moving vectors in the respective directions of east, west, south and north are required, instead of moving vectors of east-south-west-north or moving vectors of east-north-west-south. In order to prevent the contents of the maneuver database being too large, in an embodiment, a calculated moving vector is considered to be a particular moving vector in the maneuver database when the difference between the two is within a limit.

In order to signal to the processor as to when to start determining maneuvers, the stylus 750 includes a sensor for signaling to the stylus to perform one of the following steps: asking the communication module 760 to transmit a movement trajectory of the sensor 770; asking the communication module 760 to stop transmitting a movement trajectory of the sensor 770; asking the posture sensor 770 to sense a movement trajectory; and asking the posture sensor 770 to stop sensing a movement trajectory. In order to describe the implementations of the sensor, the sensor includes one of the following: a button, a touch sensitive switch, a photo-interrupter switch, a pressure sensor at the tip of the stylus, and an electrical signal sensor at the tip of the stylus. In order to conserve energy, when the posture sensor reports no movements for a certain period of time, the processor asks the posture sensor to stop sensing movement trajectories.

In order to describe when a maneuver is determined so as to reduce the computational resources used, in an embodiment, when the processor 740 has stopped receiving movement trajectories from the posture sensor 770, or when the processor 740 is periodically interrupted by an interrupt signal, the processor 740 then determines the associated maneuver and the associated command from the maneuver database based on the calculated one or more sets of moving vectors.

In order to describe the purpose of the command, in an embodiment, the command includes one of the following commands to the computing device 710: changing a property of a cursor; changing the type of a tool to which the cursor corresponds; changing the size of a tool to which the cursor corresponds; changing the color of a tool to which the cursor corresponds; changing the brightness of a display of the computing device; changing the volume of an audio module of the computing device; turning on/off of a device in the computing device; pressing of a key or a combination of keys on a keyboard; operating a mouse in a certain way; activating an application and etc. In order to increase the diversity of the command, in an embodiment, the stylus 750 further includes a particular sensor, and the communication module 760 further transmits the state of the particular sensor to the computing device 710. When the state of this particular sensor changes, the same maneuver corresponds to different commands before and after the change.

In order to describe the implementations of the communication module 760, in an embodiment, the communication module 760 includes one of the following: a wired communication module connected to the computing device via a physical wire; a wireless communication module connected to the computing device via a wireless transmission connection; and a tip section of the stylus that connects to the computing device 710 by sending electrical signals to the touch sensitive panel 720.

Figure 8:
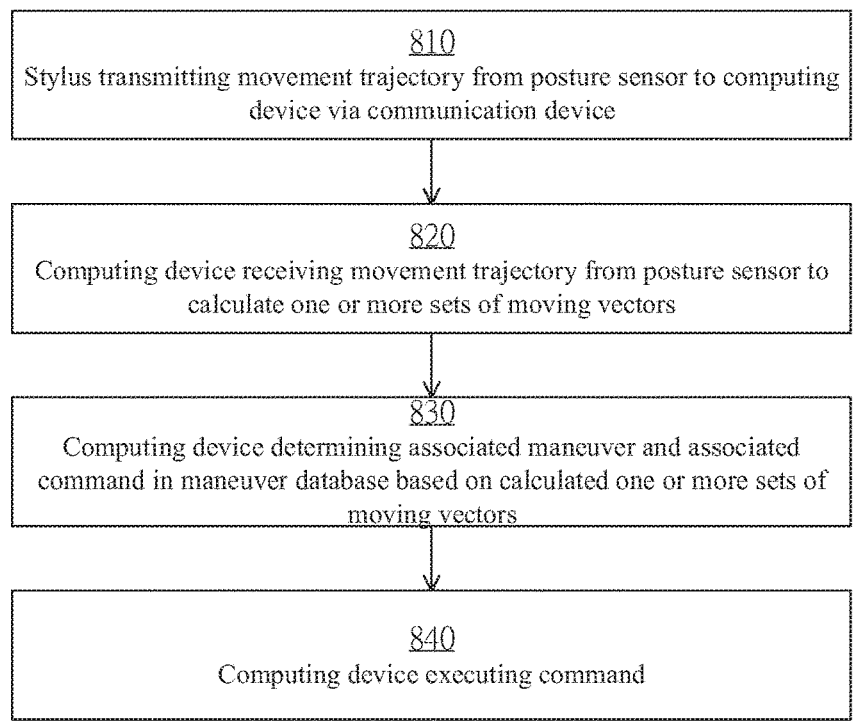
FIG. 8 is a flowchart illustrating a touch sensitive method in accordance with an embodiment of the present invention.

FIG. 8 is a flowchart illustrating a touch sensitive method in accordance with an embodiment of the present invention. This embodiment provides a touch sensitive method for commanding by maneuvering applicable to a touch sensitive system including a stylus and a computing device. The touch sensitive method includes: in step 810, the stylus transmitting a movement trajectory sensed by a posture sensor to the computing device via the communication module; in step 820, the computing device receiving the movement trajectory from the posture sensor to calculate one or more sets of moving vectors; in step 830, the computing device determining an associated maneuver and an associated command in a maneuver database based on the calculated one or more sets of moving vectors; and in step 840, the computing device executing the command.

In order to describe the implementations of the moving vectors, in one embodiment, each set of moving vectors includes any combination of the following messages with respect to a reference coordinate system from the posture sensor: a three-axis moving message; and a three-axis rotational message. In order to describe the implementations of the moving vectors in the context of the stylus and the computing device, in an embodiment, a first axis of the reference coordinate system corresponds to the long axis of the touch sensitive panel; a second axis of the reference coordinate system corresponds to the short axis of the touch sensitive panel; and a third axis of the reference coordinate system corresponds to the vertical axis with respect to the surface of the touch sensitive panel. In order to describe that some maneuvers are not made up of continuous movement trajectories, and that the moving vectors indicate that the maneuvers do not care where the origins of the coordinate system of the movements are, but rather the relative movement trajectories, in an embodiment, when a maneuver includes multiple sets of moving vectors, at least two sets of the moving vectors in the multiple sets of moving vectors are not continuous in time. For example, when describing the rotational movement of the sensor 122 shown in FIG. 1, only four sets of moving vectors in the respective directions of east, west, south and north are required, instead of moving vectors of east-south-west-north or moving vectors of east-north-west-south. In order to prevent the contents of the maneuver database being too large, in an embodiment, a calculated moving vector is considered to be a particular moving vector in the maneuver database when the difference between the two is within a limit.

In order to signal to the processor as to when to start determining maneuvers, the touch sensitive method further includes receiving the state of a sensor on the stylus, and performing one of the following steps based on the state of the sensor: asking the communication module to transmit a movement trajectory of the sensor; asking the communication module to stop transmitting a movement trajectory of the sensor; asking the posture sensor to sense a movement trajectory; and asking the posture sensor to stop sensing a movement trajectory. In order to describe the implementations of the sensor, the sensor includes one of the following: a button, a touch sensitive switch, a photo-interrupter switch, a pressure sensor at the tip of the stylus, and an electrical signal sensor at the tip of the stylus. In order to conserve energy, when the posture sensor reports no movements for a certain period of time, the processor asks the posture sensor to stop sensing the movement trajectories.

In order to describe when a maneuver is determined so as to reduce the computational resources used, in an embodiment, when the processor has stopped receiving movement trajectories from the posture sensor, or when the processor is periodically interrupted by an interrupt signal, the step of determining the associated maneuver and the associated command from the maneuver database based on the calculated one or more sets of moving vectors is then performed.

In order to describe the purpose of the command, in an embodiment, the command includes one of the following commands to the computing device: changing a property of a cursor; changing the type of a tool to which the cursor corresponds; changing the size of a tool to which the cursor corresponds; changing the color of a tool to which the cursor corresponds; changing the brightness of a display of the computing device; changing the volume of an audio module of the computing device; turning on/off of a device in the computing device; pressing of a key or a combination of keys on a keyboard; operating a mouse in a certain way; activating an application and etc. In order to increase the diversity of the command, in an embodiment, the stylus further includes a particular sensor. The touch sensitive method further includes: the communication module transmitting the state of the particular sensor to the computing device, and when the state of which changes, the same maneuver corresponds to different commands before and after the change.

In order to describe the implementations of the communication module, in an embodiment, the communication module includes one of the following: a wired communication module connected to the computing device via a physical wire; a wireless communication module connected to the computing device via a wireless transmission connection; and a tip section of the stylus that connects to the computing device by sending electrical signals to the touch sensitive panel.

Figure 9:
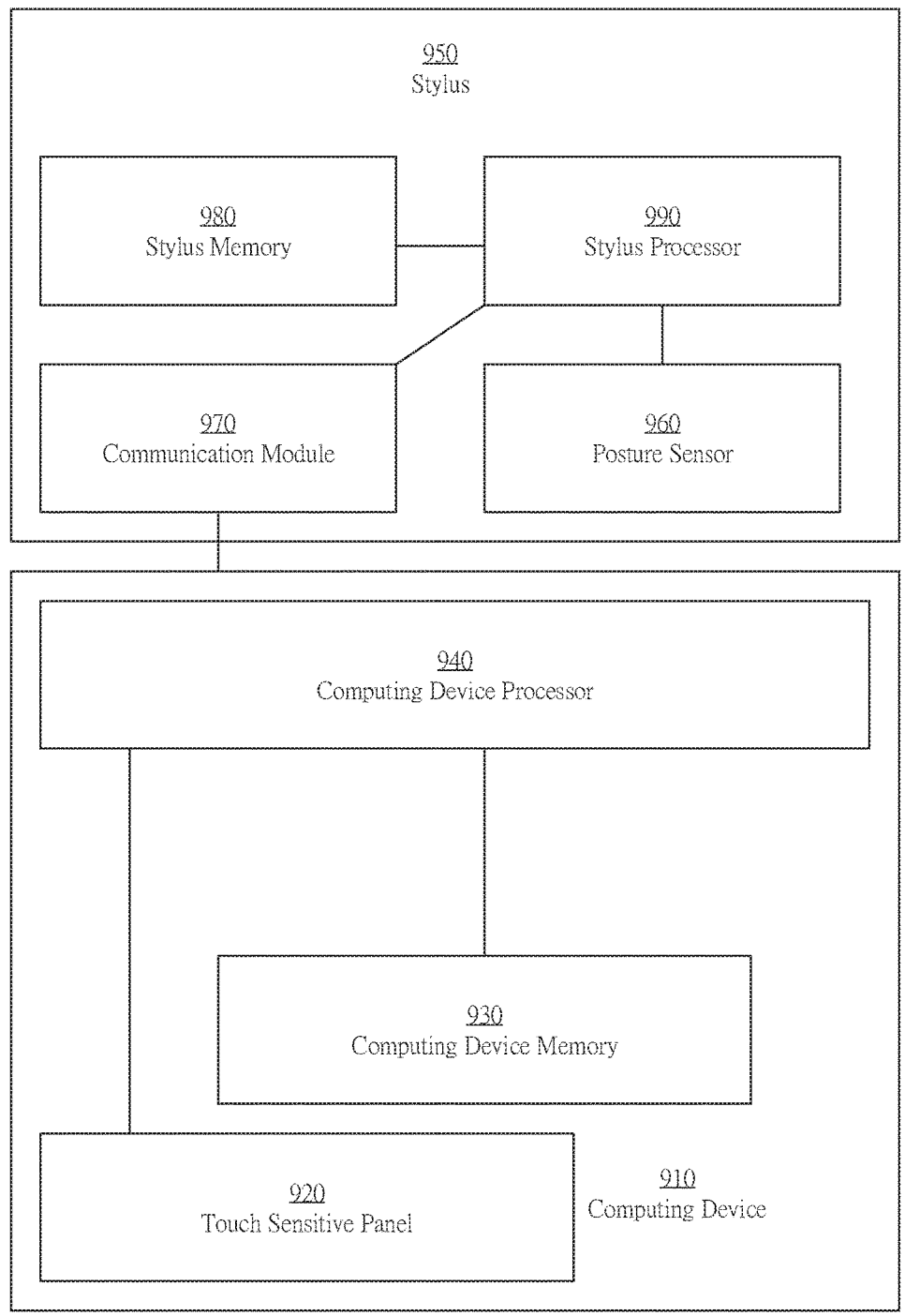
FIG. 9 is a schematic block diagram depicting a touch sensitive system in accordance with an embodiment of the present invention.

FIG. 9 is a schematic block diagram depicting a touch sensitive system in accordance with an embodiment of the present invention. This embodiment provides a touch sensitive system for commanding by maneuvering, which includes a stylus 950. The stylus 950 includes: at least one posture sensor 960; a communication module 970 connected to a computing device 910; a stylus memory 980 for storing a stylus maneuver database that includes a plurality of maneuvers, each with associated one or more sets of moving vectors; and a stylus processor 990 for receiving the movement trajectory from the posture sensor 960 to calculate one or more sets of moving vectors, determining an associated maneuver based on the calculated one or more sets of moving vectors, and transmitting the maneuver to the computing device 910 via the communication module 970. The touch sensitive system further includes the computing device 910, which includes: a touch sensitive panel 920 for detecting the location of the stylus on or near the touch sensitive panel 920; a computing device memory 930 for storing a computing device maneuver database that includes a plurality of maneuvers, each with an associated command; and a computing device processor 940 for receiving the maneuver and determining the associated command in the computing device maneuver database based on the maneuver, and executing the command.

Figure 10:
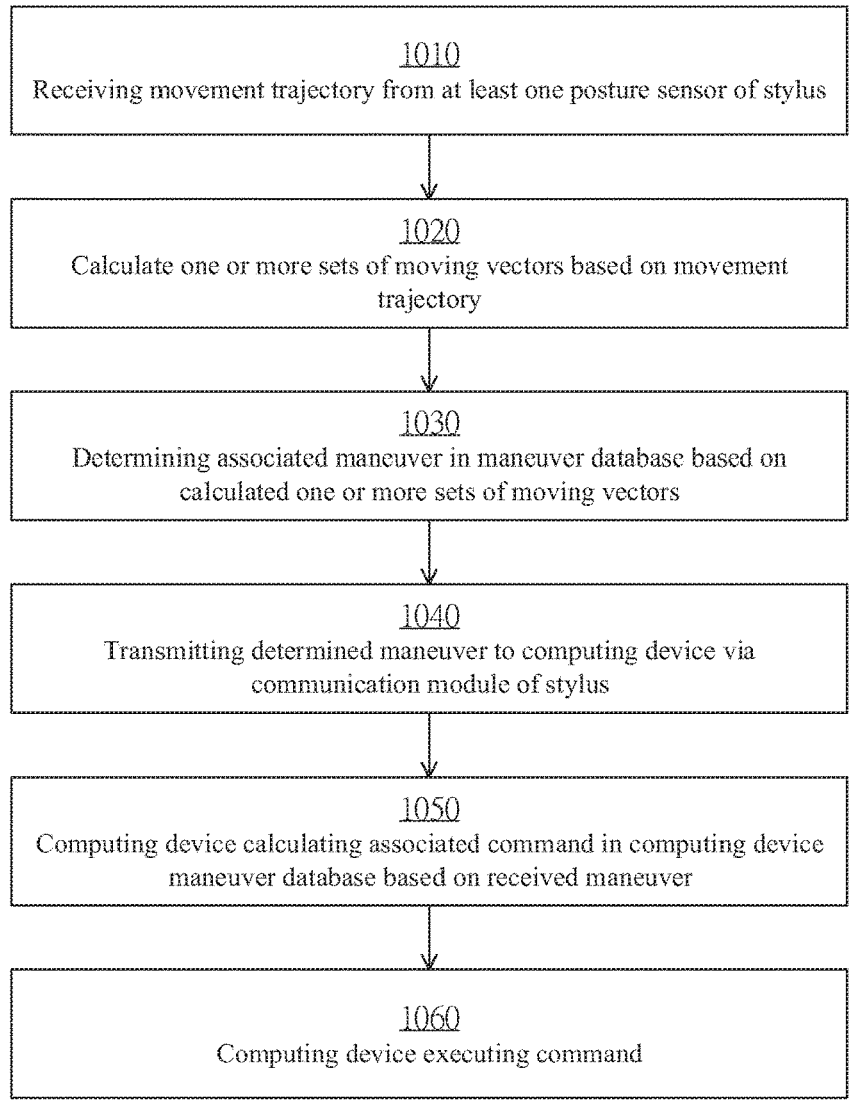
FIG. 10 is a flowchart illustrating a touch sensitive method in accordance with an embodiment of the present invention.

FIG. 10 is a flowchart illustrating a touch sensitive method in accordance with an embodiment of the present invention. This embodiment provides a touch sensitive method for commanding by maneuvering applicable to a touch sensitive system including a stylus and a computing device. The touch sensitive method includes: in step 1010, receiving a movement trajectory from at least one posture sensor of the stylus; in step 1020, calculating one or more sets of moving vectors based on the movement trajectory; in step 1030, determining an associated maneuver in a stylus maneuver database based on the calculated one or more sets of moving vectors; in step 1040, the stylus transmitting the maneuver to the computing device via a communication module, wherein the computing device includes a touch sensitive panel for detecting the location of the stylus on or near the touch sensitive panel; in step 1050, the computing device determining an associated command based on the received maneuver; and in step 1060, the computing device executing the command.

What is claimed is:

1. A stylus for commanding by maneuvering comprising:
   a communication circuit connected to a computing device, wherein the computing device includes a touch sensitive panel for detecting a location of the stylus on or near the touch sensitive panel;
   at least one posture sensor;
   a memory for storing a maneuver database that includes a plurality of maneuvers, each maneuver associated with one or more sets of moving vectors and an associated command; and
   an onboard stylus processor for receiving a movement trajectory from the posture sensor to calculate one or more sets of moving vectors, determining an associated maneuver and a respective associated command according to the maneuver database stored in the memory, and transmitting the respective associated command to the computing device via the communication circuit;
   wherein the respective associated command is a first command determined in response to determining a first associated maneuver and the respective associated command is a second command determined in response to determining a second associated maneuver.

2. The stylus of claim 1, wherein each set of moving vectors with respect to a reference coordinate system from the posture sensor corresponds to at least one of: a three-axis moving message; and a three-axis rotational message.

3. The stylus of claim 2, wherein a first axis of the reference coordinate system corresponds to a long axis of the touch sensitive panel; a second axis of the reference coordinate system corresponds to a short axis of the touch sensitive panel; and a third axis of the reference coordinate system corresponds to a vertical axis with respect to the surface of the touch sensitive panel.

4. The stylus of claim 1, wherein when the associated maneuver includes multiple sets of moving vectors, at least two sets of moving vectors among the multiple sets of moving vectors are not continuous in time.

5. The stylus of claim 1, wherein a calculated moving vector is considered to be a particular moving vector in the maneuver database when the difference between the two is within a limit.

6. The stylus of claim 1, further comprising a sensor for signaling to the onboard stylus processor, wherein the onboard stylus processor is further configured to perform one of following steps in response to the signaling from the sensor:

starting receiving a movement trajectory from the posture sensor;

stopping receiving a movement trajectory from the posture sensor;

asking the posture sensor to start sensing a movement trajectory; and asking the posture sensor to stop sensing a movement trajectory.

7. The stylus of claim 6, wherein the sensor corresponds to at least one of: a button, a touch sensitive switch, a photo-interrupter switch, a pressure sensor at the tip of the stylus, and an electrical signal sensor at the tip of the stylus.

8. The stylus of claim 1, wherein when the posture sensor reports no movements for a certain period of time, the onboard stylus processor asks the posture sensor to stop sensing a movement trajectory.

9. The stylus of claim 1, wherein when the onboard stylus processor has stopped receiving a movement trajectory from the posture sensor, or when the onboard stylus processor is periodically interrupted by an interrupt signal, the onboard stylus processor then determines the associated maneuver and the respective associated command from within the maneuver database based on the calculated one or more sets of moving vectors.

10. The stylus of claim 1, wherein the respective command transmitted to the computing device corresponds to at least one of: changing a property of a cursor; changing a type of a tool to which the cursor corresponds; changing a size of a tool to which the cursor corresponds; changing a color of a tool to which the cursor corresponds; changing a brightness of a display of the computing device; changing a volume of an audio module of the computing device; turning on or off of a device in the computing device; pressing of a key or a combination of keys on a keyboard; operating a mouse in a particular way; and activating an application.

11. The stylus of claim 1, further comprising a particular sensor, when the state of which changes, the same associated maneuver corresponds to different respective associated commands before and after the state change.

12. The stylus of claim 1, wherein the communication circuit includes one of following: a wired communication circuit connected to the computing device via a physical wire; a wireless communication circuit connected to the computing device via a wireless transmission connection; and a tip section of the stylus that connects to the computing device by sending electrical signals to the touch sensitive panel.

13. A touch sensitive system for commanding by maneuvering comprising:

a stylus including:

a communication circuit connected to a computing device, wherein the computing device includes a touch sensitive panel for detecting a location of the stylus on or near the touch sensitive panel;

at least one posture sensor;

a memory for storing a maneuver database that includes a plurality of maneuvers, each maneuver associated with one or more sets of moving vectors and an associated command; and an onboard stylus processor for receiving a movement trajectory from the posture sensor to calculate one or more sets of moving vectors, determining an associated maneuver and a respective associated command according to the maneuver database stored in the memory, and transmitting the respective associated command to the computing device via the communication circuit; and the computing device executing the command when received;

wherein the respective associated command is a first command determined in response to determining a first associated maneuver and the respective associated command is a second command determined in response to determining a second associated maneuver.

14. A touch sensitive method for commanding by maneuvering applicable to a stylus comprising following steps of:

receiving a movement trajectory from at least one posture sensor of the stylus;

calculating one or more sets of moving vectors based on the movement trajectory;

determining an associated maneuver and a respective associated command in a maneuver database based on the calculated one or more sets of moving vectors; and transmitting the respective associated command to a computing device via a communication circuit of the stylus, wherein the computing device includes a touch sensitive panel for detecting a location of the stylus on or near the touch sensitive panel;

wherein the respective associated command is a first command determined in response to determining a first associated maneuver and the respective associated command is a second command determined in response to determining a second associated maneuver.

15. The touch sensitive method of claim 14, wherein each set of moving vectors with respect to a reference coordinate system from the posture sensor corresponds to at least one of: a three-axis moving message; and a three-axis rotational message.

16. The touch sensitive method of claim 15, wherein a first axis of the reference coordinate system corresponds to a long axis of the touch sensitive panel; a second axis of the reference coordinate system corresponds to a short axis of the touch sensitive panel; and a third axis of the reference coordinate system corresponds to a vertical axis with respect to the surface of the touch sensitive panel.

17. The touch sensitive method of claim 14, wherein when the associated maneuver includes multiple sets of moving vectors, at least two sets of moving vectors among the multiple sets of moving vectors are not continuous in time.

18. The touch sensitive method of claim 14, wherein a calculated moving vector is considered to be a particular moving vector in the maneuver database when the difference between the two is within a limit.

19. The touch sensitive method of claim 14, further comprising receiving a state of a sensor on the stylus and performing one of following steps based on the state of the sensor:

starting receiving a movement trajectory from the posture sensor;

stopping receiving a movement trajectory from the posture sensor;

asking the posture sensor to start sensing a movement trajectory; and asking the posture sensor to stop sensing a movement trajectory.

20. The touch sensitive method of claim 14, wherein the sensor corresponds to at least one of: a button, a touch sensitive switch, a photo-interrupter switch, a pressure sensor at the tip of the stylus, and an electrical signal sensor at the tip of the stylus.

21. The touch sensitive method of claim 14, wherein when the posture sensor reports no movements for a certain period of time, the method further comprises asking the posture sensor to stop sensing a movement trajectory.

22. The touch sensitive method of claim 14, wherein the step of determining an associated maneuver and a respective associated command in a maneuver database based on the calculated one or more sets of moving vectors is performed when no movement trajectory is received from the posture sensor, or when an interrupt signal is periodically received.

23. The touch sensitive method of claim 14, wherein the respective associated command transmitted to the computing device corresponds to at least one of: changing a property of a cursor; changing a type of a tool to which the cursor corresponds; changing a size of a tool to which the cursor corresponds; changing a color of a tool to which the cursor corresponds; changing a brightness of a display of the computing device; changing a volume of an audio module of the computing device; turning on or off of a device in the computing device; pressing of a key or a combination of keys on a keyboard; operating a mouse in a particular way; and activating an application.

24. The touch sensitive method of claim 14, wherein the stylus further includes a particular sensor, when the state of which changes, the same associated maneuver corresponds to different respective associated commands before and after the state change.

25. The touch sensitive method of claim 14, wherein the communication circuit includes one of following: a wired communication circuit connected to the computing device via a physical wire; a wireless communication circuit connected to the computing device via a wireless transmission connection; and a tip section of the stylus that connects to the computing device by sending electrical signals to the touch sensitive panel.

* * * * *